US009800753B1

United States Patent
Zajac et al.

(10) Patent No.: US 9,800,753 B1
(45) Date of Patent: Oct. 24, 2017

(54) DATA BUFFERING AND INTERLEAVED TRANSMISSION OF SCANNED DATA

(71) Applicant: Scantron Corporation, Eagan, MN (US)

(72) Inventors: Joe Zajac, Cypress, CA (US); Jonathan Ort, Prior Lake, MN (US)

(73) Assignee: Scantron Corporation, Eagan, MN (US)

( * ) Notice: Subject to any disclaimer, the term of this patent is extended or adjusted under 35 U.S.C. 154(b) by 0 days.

(21) Appl. No.: 15/167,855

(22) Filed: May 27, 2016

(51) Int. Cl.
- H04N 1/04 (2006.01)
- H04N 1/028 (2006.01)
- H04N 1/00 (2006.01)

(52) U.S. Cl.
CPC ........... *H04N 1/04* (2013.01); *H04N 1/00328* (2013.01); *H04N 1/02815* (2013.01); *H04N 2201/0039* (2013.01); *H04N 2201/0081* (2013.01)

(58) Field of Classification Search
CPC ....... H04N 1/00326; H04N 2201/0081; H04N 1/00204; H04N 1/00331; H04N 1/00334; H04N 1/4486; H04N 1/00127; H04N 1/2032; H04N 1/44; H04N 1/4493; H04N 2201/0039; H04N 2201/0041; H04N 2201/007
USPC ........ 235/432, 470; 358/462, 474, 1.15, 1.9, 358/1.13, 1.14, 448, 1.11, 1.2, 3.28, 401, 358/403, 498, 518, 540; 380/243; 382/175, 313, 101, 100, 107, 305, 103, 382/132, 181, 182, 190, 218, 243; 348/E7.069, E7.085, E7.091, 158, 161, 348/222.1; 709/217, 219, 213, 221
See application file for complete search history.

(56) References Cited

U.S. PATENT DOCUMENTS

| | | | | |
|---|---|---|---|---|
| 2002/0060765 | A1* | 5/2002 | Hattori | G02F 1/1395 349/134 |
| 2005/0237580 | A1* | 10/2005 | Coleman | H04N 1/00127 358/462 |
| 2005/0238260 | A1* | 10/2005 | Coleman | H04N 1/00326 382/313 |
| 2008/0093978 | A1* | 4/2008 | Mori | B82Y 20/00 313/498 |
| 2008/0112564 | A1* | 5/2008 | Vanderstraeten | H04L 9/00 380/243 |
| 2008/0130946 | A1* | 6/2008 | Wiersma | B07C 3/14 382/101 |
| 2008/0227075 | A1* | 9/2008 | Poor | G09B 7/02 434/307 R |

(Continued)

Primary Examiner — Negussie Worku
(74) Attorney, Agent, or Firm — Fish & Richardson P.C.

(57) ABSTRACT

Performing optical mark recognition (OMR) scanning includes receiving a first substrate to be scanned, the first substrate having one or more colors visible to a human eye and bearing user-made marks; scanning the first substrate using a plurality of colors of light emitted from a light sensor to simultaneously generate both (a) first image data representing a visual appearance of the first substrate, and (b) first OMR data corresponding to respective locations of the user-made marks on the first substrate; transmitting from a first page buffer at least a portion of the first image data and/or at least a portion of the first OMR data; receiving a second substrate to be scanned; and during the transmitting from the first page buffer, simultaneously scanning the second substrate.

18 Claims, 6 Drawing Sheets

(56) References Cited

U.S. PATENT DOCUMENTS

| | | | | |
|---|---|---|---|---|
| 2008/0311551 | A1* | 12/2008 | Reed | G06K 9/2063 |
| | | | | 434/356 |
| 2009/0130644 | A1* | 5/2009 | Lee | G09B 7/077 |
| | | | | 434/327 |
| 2010/0117856 | A1* | 5/2010 | Sonderegger | G01D 4/02 |
| | | | | 340/870.02 |
| 2010/0252628 | A1* | 10/2010 | Chung | G07C 13/00 |
| | | | | 235/386 |
| 2011/0189647 | A1* | 8/2011 | Radtke | G06K 9/00442 |
| | | | | 434/363 |

* cited by examiner

DATA BUFFERING AND INTERLEAVED TRANSMISSION OF SCANNED DATA

TECHNICAL FIELD

This disclosure relates to scanning documents and transmitting the scanned data e.g., performing optical mark recognition (OMR) on a test form or the like that has been marked on using a writing instrument (e.g. pen, pencil).

BACKGROUND

Optical mark recognition (OMR), also referred to as optical mark reading, is the process of capturing human-marked data from document forms such as surveys, tests, or other substrates bearing markings. One of the most familiar applications of optical mark recognition is the use of #2 pencil (HB in Europe) bubble optical answer sheets in multiple choice question examinations. Students mark their answers, or other personal information, by darkening circles marked on a pre-printed sheet. Afterwards the sheet is automatically graded by a scanning machine.

Many traditional OMR devices work with a dedicated scanner device that shines a beam of light onto the form paper. The contrasting reflectivity at predetermined positions on a page is then used to detect these marked areas because they reflect less light than the blank areas of the paper.

Figure 1:
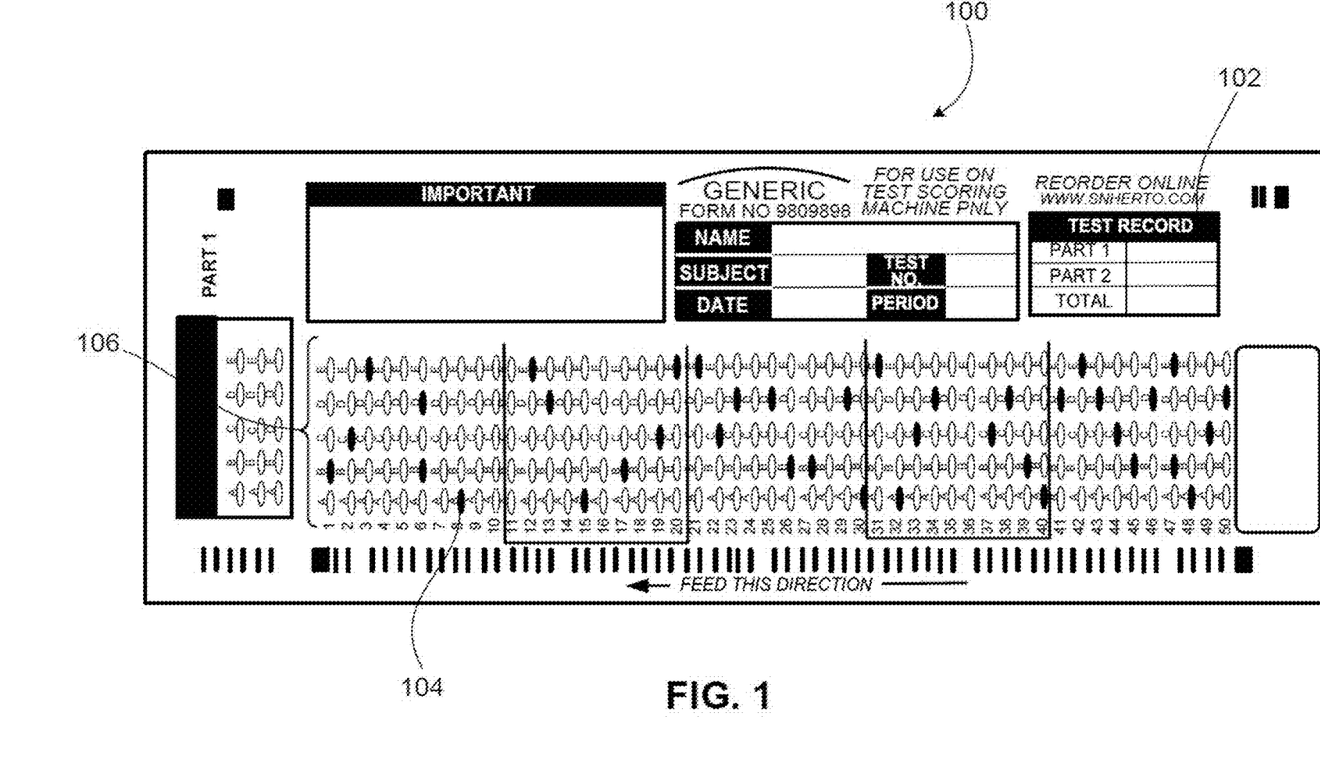
FIG. 1 illustrates an example of an OMR test form.

FIG. 1 shows an example of a test form 100 that may be used with OMR. The form 100 typically is a thin sheet of paper having various markings such areas 102, which can take on various colors such as red, blue, orange, green, black, or grey, and multiple choice answer receiving areas 106, each area having a label A, B, C, D, or E. The example form shown in FIG. 1 has 250 answer receiving answers formed as a matrix having 50 rows, with five answer receiving areas 106 per row. While taking a test, the test taker uses a writing instrument to make a mark, such as oval 104, in one of the desired answer receiving areas 106 corresponding to which answer (A, B, C, D, or E) the test taker believes is correct. Once completed, the form 100 is handed in to the test proctor and it is run through an OMR scanner, which reads the positions of the markings and compares them to a predetermined set of correct answers. In this manner, the test taker's test form 100 is graded.

SUMMARY

This disclosure relates to scanning documents and transmitting the scanned data e.g., performing optical mark recognition (OMR) on a test form or the like that has been marked on using a writing instrument (e.g. pen, pencil). In an exemplary implementation, one or more aspects of the subject matter described in this specification can be embodied in one or more methods that include: receiving a first substrate to be scanned, the first substrate having one or more colors visible to a human eye and bearing user-made marks; scanning the first substrate using a plurality of colors of light emitted from a light sensor to simultaneously generate both (a) first image data representing a visual appearance of the first substrate, and (b) first OMR data corresponding to respective locations of the user-made marks on the first substrate; routing both the generated first image data corresponding to the first substrate and the generated first OMR data corresponding to the first substrate to a first page buffer to be temporarily stored; transmitting from the first page buffer at least a portion of the first image data and/or at least a portion of the first OMR data; receiving a second substrate to be scanned, the second substrate having one or more colors visible to a human eye and bearing user-made marks; and during the transmitting from the first page buffer, simultaneously scanning the second substrate using a plurality of colors of light emitted from the light sensor to simultaneously generate both (a) second image data representing a visual appearance of the second substrate, and (b) second OMR data corresponding to respective locations of the user-made marks on the second substrate.

In an exemplary implementation, one or more aspects of the subject matter described in this specification can be embodied in one or more methods that include: receiving a substrate to be scanned, the first substrate having at a plurality of pixels rows of colors visible to a human eye and bearing user-made marks; scanning a first pixel row of the substrate using at least three colors of light emitted from a light sensor to simultaneously generate both (a) image data representing a visual appearance of the substrate, and (b) OMR data corresponding to respective locations of the user-made marks on the first substrate; routing the generated image data to an image buffer; routing the generated OMR data to an OMR buffer; determining whether the image buffer or the OMR buffer has reached a maximum capacity; based on the determining, transmitting at least a portion of the image data from the image buffer or at least a portion of the OMR data from the OMR buffer; and during the transmitting, simultaneously scanning one or more additional pixel rows of the substrate using a plurality of colors of light emitted from the light sensor to simultaneously generate both (a) additional image data representing a visual appearance of the substrate, and (b) additional OMR data corresponding to respective locations of the user-made marks on the second substrate.

In an exemplary implementation, one or more aspects of the subject matter described in this specification can also be embodied in one or more systems that include: a computer network; and an OMR scanner coupled with the computer network, wherein the OMR scanner is programmed to: (i) receive a first substrate to be scanned, the first substrate having one or more colors visible to a human eye and bearing user-made marks; (ii) scan the first substrate using a plurality of colors of light emitted from a light sensor to simultaneously generate both (a) first image data representing a visual appearance of the first substrate, and (b) first OMR data corresponding to respective locations of the user-made marks on the first substrate; (iii) route both the generated first image data corresponding to the first substrate and the generated first OMR data corresponding to the first substrate to a first page buffer to be temporarily stored; (iv) transmit from the first page buffer, via the computer network, at least a portion of the first image data and/or at least a portion of the first OMR data; and (v) receive a second substrate to be scanned, the second substrate having one or more colors visible to a human eye and bearing user-made marks; and (vi) during the transmitting from the first page buffer, simultaneously scan the second substrate using a plurality of colors of light emitted from the light sensor to simultaneously generate both (a) second image data representing a visual appearance of the second substrate, and (b) second OMR data corresponding to respective locations of the user-made marks on the second substrate.

In an exemplary implementation, one or more aspects of the subject matter described in this specification can also be embodied in one or more systems that include: a computer network; and an OMR scanner coupled with the computer network, wherein the OMR scanner is programmed to: (i) receive a substrate to be scanned, the first substrate having at a plurality of pixels rows of colors visible to a human eye and bearing user-made marks; (ii) scan a first pixel row of the substrate using at least three colors of light emitted from a light sensor to simultaneously generate both (a) image data representing a visual appearance of the substrate, and (b) OMR data corresponding to respective locations of the user-made marks on the first substrate; (iii) route the generated image data to an image buffer; (iv) route the generated OMR data to an OMR buffer; (v) determine whether the image buffer or the OMR buffer has reached a maximum capacity; (vi) based on the determining, transmit, via the computer network, at least a portion of the image data from the image buffer or at least a portion of the OMR data from the OMR buffer; and (vii) during the transmitting, simultaneously scan one or more additional pixel rows of the substrate using a plurality of colors of light emitted from the light sensor to simultaneously generate both (a) additional image data representing a visual appearance of the substrate, and (b) additional OMR data corresponding to respective locations of the user-made marks on the second substrate.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to scanning documents and transmitting the scanned data e.g., performing optical mark recognition (OMR) on a test form or the like that has been marked on using a writing instrument (e.g. pen, pencil).

The present inventors recognized that in certain situations, for example, high-stakes testing environments such as professional board exams or the like, disputes about whether an OMR scanner incorrectly graded a test form, e.g., by improperly detecting the absence or presence of a marking in an answer receiving area corresponding to a wrong answer, may have serious consequences for the test taker, especially when the margin between passing and failing the test rides on the correctness of a single answer. In such situations, typically the answer form in question is either re-scanned or visually inspected to determine whether in fact the OMR scanner detected a false positive or a false negative, thereby resulting in a grading error. The inventors recognized, however, that the answer form may change appearance between the time it was scanned and the time it is visually inspected or re-scanned. For example, after the scanning has occurred and the answer form is carried along the scanner's form pathway, the form may become smudged, scraped or otherwise altered in appearance such that an answer receiving area is darkened or lightened relative to the time of scanning. In such cases, any subsequent re-scanning or visual inspection may be incorrect as a result of the post-scanning alteration in appearance, thereby potentially resulting in incorrect grading of the answer form.

Accordingly, the present inventors recognized the importance, and attendant advantages, of capturing a digital image of the answer form at the same time as it is being OMR scanned. That way, any subsequent post-scanning alterations of the form will not affect the visual re-grading of the answer form. Rather, the digital image of the form as it appeared at the time of scanning can be consulted and used for re-grading purposes. In addition, both the test taker and the test giver are assured of the identity and appearance of the answer form that was scanned and assigned its corresponding grade. Moreover, a full color digital image is useful to serve as legal evidence of what the answer form that was actually OMR scanned looked like at the exact time of scanning.

Furthermore, existing OMR scanners may scan data at rates that are faster than the rates associated with subsequently processing and/or transmitting the scanned data. Consequently, a bottleneck between initially scanning a sheet of paper and transmitting the scanned data interpreted from that sheet may be experience in current OMR scanning techniques. Furthermore, typical OMR scanners can require that a sheet, or test form, be completely scanned, processed, and transmitted to a communicatively connected data processing device, such as a personal computer (PC), before scanning of the next sheet can commence. Some applications of OMR techniques include additional functions, such as printing a calculated score corresponding to each respective test form. Accordingly, OMR scanners may encounter a lapse between scanning consecutive sheets, so as to finish the image and information processing associated with the currently scanned sheer prior to starting the scan of a following sheet in a stack, for example. Additional capabilities, such as performing commands based on the scanned data itself, can also require that processing and/or communicating scanned data be accomplished before subsequent sheets are scanned, and thereby affecting the overall throughput of an OMR scanner. Moreover, the effects of these delays may be propagated through successively scanned sheets, as OMR scanner techniques can involve scanning large amounts of data at significantly high volumes e.g., 7,000 sheets per hour.

Thus, the present inventors recognized the importance, and attendant advantages, of implementing OMR scanner functions that support simultaneously completing transmission of data collected from a scanned substrate, for example a form, while buffering newly obtained data during the start of scanning a subsequent form. Accordingly, the data buffering and interleaved transmission techniques of the embodiments can realize a reduced delay between transmitting and scanning consecutive forms handled by the OMR scanner. Moreover, the present inventors recognized the importance of implementing OMR scanner functions that provide data buffering and interleaved transmission respectively for each of multiple data streams (e.g., image data stream and OMR data steam) scanned from a single form or sheet. These techniques allow for the transmission of segments of scanned data to occur simultaneously with scanning, and subsequently buffering, additional segments of data from the same form. Therefore, techniques of embodiments can decrease the time needed to complete transmission of scanned data for each form, as segments of scanned data are packetized and communicated upon becoming prepared for transmission, as opposed to postponing transmission until scanned data from the entire form is processed (e.g., scanned data for each form transmitted in one packet).

Figure 2:
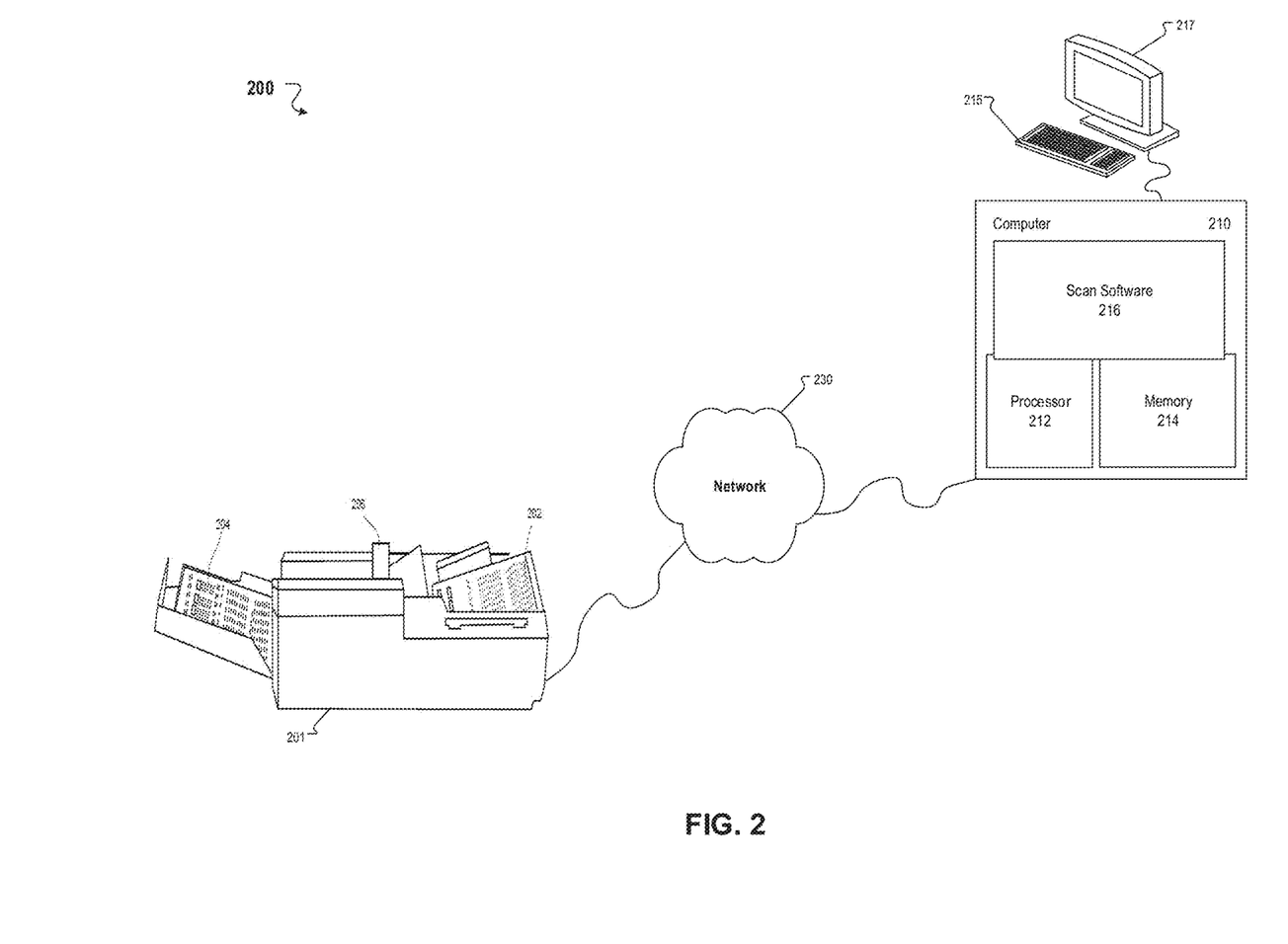
FIG. 2 illustrates an example of a communications system including an OMR scanner.

FIG. 2 shows an example of a system 200 usable to obtain, process, and transmit data that is scanned from a sheet of paper, for example a test form, using an OMR scanner 201. As shown in FIG. 2, the system can include OMR scanner 201, a computer network 230, and a computer 210. In the embodiments, the OMR scanner has a form input tray 202, a form output tray 204, a glass or otherwise transparent platen (not shown) on which the form rests during scanning, and a scanning head 206. The OMR scanner 201 pulls one form at a time from the input tray 202 and runs it through the scanner pathway, which includes positioning the form on the platen (not shown), and activating the scanning head 206 to scan for the presence and location of marks on the form. The presence of non-marked images on the form (e.g. background form marking) is not desirable to collect the OMR marks and ideally should be removed at scan-time. One technique to doing this is the use of Infrared (IR) light and marking the test with a graphite-based pencil. The scanner head 206 accomplishes this task by illuminating the form with IR light, which causes the graphite-based pencil markings to appear opaque to the OMR sensor, while all other areas on the form (i.e., those areas not bearing graphite-based markings) are transparent to the sensor. According to the embodiments, the OMR scanner 210 is further configured to implement the approaches for buffering and interleaving transmission of scanned data as discussed in reference to FIG. 6, so as to communicatively transfer information to computer 210 for further processing, such as displaying a scanned image of a student associated with a test form.

The computer 210 includes a processor 212 and a memory 214, and the computer 210 can be connected to the computer network 230, which can be a private network, a public network, a virtual private network, etc. The computer network 230 can be implemented as either a wired network (e.g., Ethernet) or a wireless network. The various devices of system 200, including OMR scanner 201, and computer 210, can be connected via computer network 230. Additional devices can be connected to the network 230, and perform supplemental scanning and/or image processing related functions in concert with the OMR scanner 201. As an example, a printer (not shown) can be connected to network 230 to act as a peripheral device to computer 210, and thereby used to print calculated scores resulting from processing OMR data scanned from test forms. Examples of computer networks include, but are not limited to, a local area network (LAN), a wide area network (WAN), and the Internet. As shown in FIG. 2, the computer network 230 is a wired network so that devices can communicate, or otherwise transmit, data via physical connections such as USB (USB) connectors. For instance, OMR scanner 201 can be configured to employ a USB 3.0 interface. In some implementations, computer network 230 can be a wireless local area network (WLAN), such as IEEE 802.n network. Thus, OMR scanner 201 and computer 210, for example, are communicatively coupled, and capable of wireless transmission of scanned data via the computer network 230.

The processor 212 can be one or more hardware processors, which can each include multiple processor cores. The memory 214 can include both volatile and non-volatile memory, such as Random Access Memory (RAM) and Flash RAM. The computer 210 can include various types of computer storage media and devices, which can include the memory 214, to store instructions of programs that run on the processor 212.

Such programs can include scan software 216, which can run locally on computer 210, remotely on a computer of one or more remote computer systems (e.g., in a third party provider's server system accessible by the computer 210 via the network 230), or on a combination of one or more of each of the preceding. In some embodiments, the OMR scanner 201 is configured to operate with scan software 216 so as to provide reading of scan data from forms input into the input tray 202, for example. The scan software 216 can be employed to implement various operations such as, maintaining files, defining scannable forms, in addition to scanning, editing, validating, and displaying data. In some embodiments, the scan software 216 can be integrated into other software programs installed on computer 210 so as to implement scanning capabilities within the tools supported by the other programs. For example, integration of scan software 216 capabilities can include converting files of scanned data from OMR device 201 to into one or more formats compatible with other software programs (e.g., Microsoft® Access, Excel, Lotus). For instance, scan software 216 can present a user interface (UI) employed for displaying, or otherwise rendering, a representation of scanned data on a display device 217 of the computer 210. The display device 217 can be operated using one or more input devices 215 of the computer 210 (e.g., keyboard and mouse or touch screen). Note that while shown as separate devices in FIG. 2, the display device 217 and/or input devices 215 can also be integrated with each other and/or with the computer 210, such as in a tablet computer.

Additionally, the scan software 216 is programmed to reassemble one or more segments of scanned data transmitted to computer 210 from OMR scanner 201 using the buffering and interleaved transmission techniques of the embodiments. According to the embodiments, scanned data from a single sheet can be partitioned into multiple data segments that are packetized, and potentially resulting in data packets of varying sizes. Thereafter, the packets are transmitted via computer network 230. In some embodiments, the multiple segments of scanned data can be transmitted asynchronously. Moreover, various data segments can convey information from separate and distinct data streams of scanned data, such as data segments from an image data stream comprising multi-color data (e.g., red, green, blue) and data segments comprising fixed-resolution data from an OMR data stream. Thus, as an example, a data stream received by computer 210 can include data packets conveying OMR data and separate packets conveying image data that are interleaved during transmission from the OMR scanner 201. Also, data buffering and interleaving techniques of the embodiments can cause data segments communicated to computer 210 to be received in an interleaved order that is different from the original order obtained by OMR scanner 201. For example, during an interleaved transmission, packets corresponding to OMR image data can be transmitted, while additional packets corresponding to the remaining OMR image data for the same substrate is transmitted after digital image data. Accordingly, scan software 216 can implement reassembly of the data segments associated with the scanned image(s) that may be received in a divided chucks, or an interleaved order, at computer 210.

In some embodiments, reassembly functions of the scan software 216 can include, storing all of the received packets that are associated with the same form, for example, in a storage mechanism of computer 210, such as memory 214. Subsequently, the scan software 216 can employ order related information that can be included in each received packet so as to rearrange the scanned data contained in the packets in a manner which consecutively reassembles the sets of bytes to reconstruct the scanned image. The order related information can be implemented as any data suitable for indicating, and otherwise maintaining, the sequential ordering corresponding to scanned data communicated in the packets. For instance, order related information can be data such as identifiers or buffer memory addresses correspondingly used to buffer bits of scanned data. In some embodiments, identifiers associated with certain buffer memory locations can indicate an order of a byte within a sequential set of scanned data bytes for a sheet. Additionally, a buffer identifier that is associated with a data buffer dedicated to buffering a particular data stream can be used to indicate the type of data, OMR data or image data, included in the packet. Thus, reassembly methods can include aggregating data bytes corresponding to the same data type.

Figure 3:
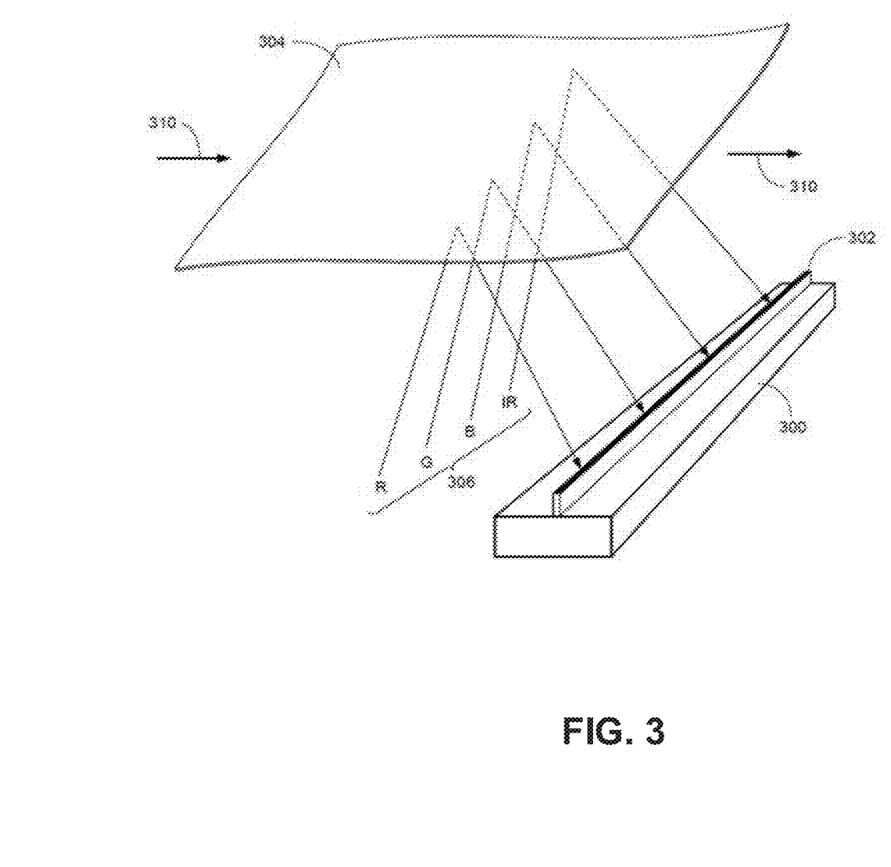
FIG. 3 illustrates scanning of a substrate by a four color scanner head.

FIG. 3 illustrates a conceptual representation of how to capture a digital image of a substrate (e.g., an answer form) at the same time as OMR scanning is performed on the substrate to detect the presence and location of user-made markings on the form, whether graphite-based or otherwise (e.g., ink). As used herein, capturing a digital image "at the same time" as OMR scanning is performed (equivalently, "simultaneously with the OMR scanning") means that both functions (i.e., generating OMR data and generating digital image data) are performed during a single pass through the scanner apparatus.

As shown in FIG. 3, as part of passing through the scanning path of the scanner, the substrate 304 is passed in the direction of arrows 310 over a light sensor 302, which forms part of the scanning head 300. Scanning of the substrate 304 occurs during a single pass in which the substrate 304 and the sensor 302 are moved relative to each other. In the example shown in FIG. 3, it is the substrate 304 that is moved past the sensor 302, which remains stationary. Alternatively, the relative movement between the substrate 304 and the sensor 302 could be achieved by holding the substrate 304 stationary and moving the sensor 302 over the substrate 304 in a single pass.

To perform the scan, the scanner uses a light source 306 to successively illuminate a portion of the substrate 304 currently passing over the sensor 302 in a particular color, e.g., red, green, blue, or infrared. The particular color to be used for generating OMR data can be encoded on the substrate 304, and read by the scanner apparatus as the substrate 304 is fed into the device prior to scanning. For example, the substrate 304 may be encoded with information that tells the scanner that the substrate 304 should be scanned in a manner corresponding to graphite-based user-made marks (e.g., pencil marks). In that case, the scanning operation involves successively illuminating a portion of the substrate 304 currently passing over the sensor 302 with each of four different colors of light, namely, red, green, blue, and infrared, in sequence. The reflected red, green, and blue light picked up by the sensor 302 is used to generate image data representing a visual appearance of the side of the substrate 304 being scanned. The IR light is used to drop out all colors, leaving only the graphite-based marks visible to the sensor 302, which picks up their presence and location and uses that information to generate OMR data.

Alternatively, the substrate 304 may be an answer form that is printed in a particular color, e.g., red, and bears encoding marks to inform any suitable scanner that will ultimately scan the form that the OMR scanning operation is to be performed using an analogous color of light, in this example, red light. Accordingly, after the form has been marked by the user (e.g., using a blue or black ink pen), and inserted into the scanner, the substrate 304 is moved past the sensor 302 while a portion of the substrate 304 currently passing over the sensor 302 is successively illuminated with each of (up to) three different colors of visible light, namely, red, green, and blue, in sequence. As above, the reflected red, green, and blue light picked up by the sensor 302 is used to generate image data representing a visual appearance of the side of the substrate 304 being scanned. In addition, because the substrate 304 is printed in red, illuminating the substrate with red light has the effect of causing the non-marked areas to "drop out" while making the marked areas visible to the sensor 302. In other words, the red light illumination is used to capture both OMR data and digital image data at the same time. Other combinations of using the same printing color and light color to achieve this same result are possible. In addition, a color model other than RGB (e.g., cyan, magenta, yellow) could be used for the scanning operation. Moreover, any suitable type of sensor may be used, for example, a contact image sensor (CIS) or a charge-coupled device (CCD), depending on the desired implementation. If a CIS is used, typically the substrate being scanned would be in contact with the sensor as it passes over while being scanned.

Because it may be desirable to have digital images of both sides of the form, a scanner apparatus may have a pair of opposing sensors between which the substrate being scanned is passed a single time. During that single pass, one sensor scans a first side of the substrate (e.g., the front) while, at the same time, the other sensor scans a second side of the substrate (e.g., the back). In this manner, a complete visual record of the substrate is captured at the same time as the OMR data for that form is captured. According to the embodiments, the scanning head 300 can convey scanned data to dedicated circuitry of the OMR scanner, such as an integrated circuit (IC) chip that is configured for implementing data buffering circuitry, as discussed in reference to FIG. 4. In some embodiments, scanner head 300 is employed for reading a top portion of substrate 304, and a second dedicated scanner head (not shown) is utilized for additionally scanning the bottom side of the substrate 304. Thus, an IC chip can be configured to implement data buffering components for processing image data scanned, or otherwise read, from each scanner head respectively.

After the scanning has been completed, a test results file corresponding to the scanned substrate 304 may be formed, e.g., by associating the digital image(s) of an answer form with the OMR test score results for that same form. The test results file can be transmitted to an external computer system and, for example, stored in a database for future reference. The data for a scanned form is fully processed and transmitted before the next form to be scanned is received for the scanning operation. In this manner, all parties concerned are assured that the digital image of each form accurately represents the form as it appeared at the time of OMR scanning. The external computer system may store all or just some portion of the captured image.

Figure 4:
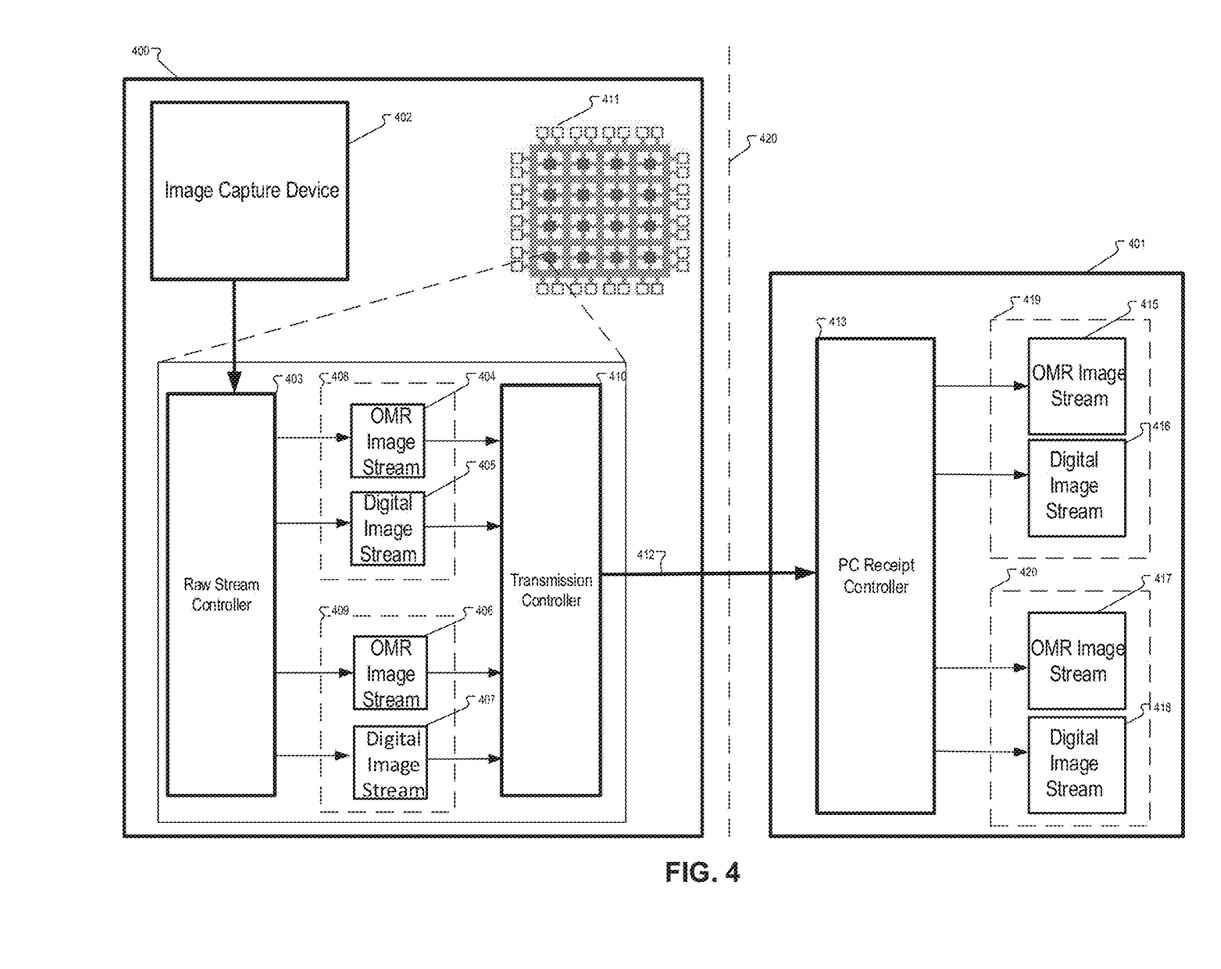
FIG. 4 illustrates an example of a system including data buffering components used to implement data buffering and interleaved transmission of scanned data.

FIG. 4 illustrates an example of a system including data buffering components used to implement data buffering and interleaved transmission of scanned data. In existing image scanner technologies, data may be read in large amounts and more quickly than can be appropriately handled by the internal processing capabilities of the scanner. Therefore, some scanners employ data buffering elements and techniques, such as a first-in-first-out (FIFO) buffer technology, so as to temporarily store data after scanning for subsequently performing image and/or information processing, which may cause a time lapse between initially capturing the scanned data and transmission of the scanned data. The embodiments can realize efficient buffering techniques that can effectively perform scanning and transmission simultaneously, and thereby reducing the associated delay. As shown in FIG. 4, the system includes circuitry and components implemented in an OMR Scanner 400 and employed to interleave, buffer, and transmit multiple streams of scanned data for multiple pages to the components of a receiving computer system 401. For example, the Computer 401 can be a personal computer that is externally located from the OMR Scanner 400.

At the OMR scanner 400, raw image data can be extracted from a substrate using an Image-Capture Device 402. In some implementations, the Image-Capture Device 402 can be implemented using a CIS, where a substrate is scanned while coming into contact with the sensor. As each row of pixels is read from a substrate, the raw data (row of pixels) is routed, or otherwise loaded, into an appropriate memory buffer via the Raw Stream Controller 403. Raw data transferred to the Raw Stream Controller 403 can include image data represented as rows, or sub-rows, of pixels from the CIS array, where each pixel indicates the presence of light (e.g., light) or the absence of light (e.g., dark). The OMR Scanner 400 further includes separate memory buffers that are utilized for receiving and temporarily storing streams of raw data, which divides and respectively buffers raw data that is associated with a digital image of the scanned substrate and the raw data associated with an OMR image of the scanned substrate. OMR Image Stream Buffers 404, 406 are configured for storing scanned OMR image data that can represent fixed resolution images used for OMR.

The Digital Image Steam Buffers 405, 407 are configured for storing the scanned digital image that can represent a variable resolution true image of a substrate, such as a digitally scanned visual representation of a test form. For example, during the relative movement of the substrate and the light sensor, a substrate is scanned using at least one color of light (e.g., red, green, blue, and potentially also a fourth color, infrared) to simultaneously generate both (a) image data representing a visual appearance of the substrate, and (b) OMR data corresponding to respective locations of the user-made marks on the substrate. Accordingly, streams of raw data associated with the colored light, or scanned true image data, is buffered in either of the two Digital Image Stream Buffers 405, 407. Furthermore, streams of raw data associated with scanned OMR image data, is buffered in either of the two OMR Image Stream Buffers 404, 406.

The OMR Scanner 400 can include a buffer configuration that utilizes a dedicated pair of stream buffers for each substrate, or page, that is scanned. As an example shown in FIG. 4, OMR Image Stream Buffer 404 and Digital Image Stream Buffer 405 can collectively operate as a Page Buffer 408 and temporarily store raw data that has been scanned from a page. Similarly, OMR Image Stream Buffer 406 and Digital Image Stream Buffer 407 can collectively operate as a separate page buffer 409. By employing separate and distinct page buffers, the OMR Scanner 400 can buffer image data for a scanned page n, for instance, and during transmission of the scanned image data from one page buffer the device can simultaneously commence scanning the next sequentially loaded page n+1. For example, after page n is physically done scanning, and prior to transmitting all of the scanned image data from page buffer 408, the OMR Scanner 400 can begin filling the opposing page buffer 409 with image data from the following scanned page n+1. Therefore, the dual buffering technique of the embodiments, using Page Buffers 408, 409, can realize a solution that reduces the delay in physically scanning successive pages due to transmission of scanned data. In an embodiment, the Raw Data Controller 403 is programmed to perform selection of a Page Buffer 408,409 to route all scanned data for the currently scanned page. The Raw Data Controller 403 can dynamically select the appropriate Page Buffer 408,409 employed to temporarily store scanned data for buffering a particular page, where the selection can be based on one or more trigger events (e.g., empty buffer, last transmitted packet). Alternatively, the Raw Stream Controller 403 can perform an iterative buffer selection and load opposing page buffers for each subsequent page, for example using page buffer 408 for each odd-numbered page, and Page Buffer 409 for each even-numbered page in a sequence of consecutively scanned pages.

According to the embodiments, programmable logic devices of an integrated circuit (IC) chip 411, for example a field programmable gate array (FPGA), can be configured to implement data buffers 404,405,406,407 and controllers 403, 410 for an OMR Scanner 400. As illustrated in FIG. 4, a portion of the circuitry and resources available on the IC chip 411 can be configured to perform the data buffering and interleaved transmission techniques of the embodiments. For example, embedded on-chip resources, such as embedded block RAM, can be employed as data buffering memory elements implemented on IC chip 411. In some embodiments, the IC chip 411 can be implemented as a system on a chip (SoC) microchip. In some embodiments, the implementation of functions for the Transmission Controller 410 are distributed using firmware (not shown) and circuitry of the IC chip 411.

The Transmission Controller 410 can be used to transmit scanned image data from the buffers of OMR Scanner 400 to a Computer 401 for further image and/or information processing. Data packets including the scanned image data can be generated subsequent to emptying a data buffer (e.g., flushing all scanned data from a memory buffer). In some implementations, each of the OMR Image Stream Buffers 404, 406 and Digital Image Stream Buffers 405,407 are configured to a data buffer size of 4,000 bytes of data. Accordingly, the Transmission Controller 410 can transmit data packets when an individual stream buffer becomes filled to its storage capacity, for example holding 4 kilobytes of scanned image data, and thereby interleaving the transmission of both OMR image data and digital image data. Thereafter, the Transmission Controller 410 can transmit the generated data packets to one or more devices externally located from the OMR Scanner 400 across a network 420 (e.g., Ethernet) via a network interface 412. The network interface 412 can be implemented as a physical connection to an external device, such as USB connector.

At the Computer 401, the data packets can be received from the OMR scanner 400 using a PC Receipt Controller 413. An OMR image stream and digital image stream can be received by Computer 401 in a stream of packets including data segments that convey either OMR image data or digital image data, and that have been interleaved during transmission from their respective stream buffers. The PC Receipt Controller 413 functions to reassemble the data segments in accordance with the proper order and image stream, so as to reconstruct both the scanned OMR image and true image. During reassembly, the PC Receipt Controller 413 can load, or otherwise transfer, the segments of scanned data into memory buffers. OMR Image Stream Buffers 415, 417 are employed to store data segments associated with the OMR image stream. Similarly, Digital Image Stream Buffers 416, 418 are employed to store data segments associated with the digital image stream. Additionally, the stream buffers are separated into conceptual Page Buffers 419, 420, and used to store all of the data segments associated with the same page or substrate. Referring to the previous example, OMR image data captured from scanning page n can be stored, aggregated, and reassembled using OMR Image Stream Buffer 415 to reconstruct the OMR image for that page. Furthermore, digital image data for the same page, that is page n, can be stored, aggregated, and reassembled using Digital Image Stream Buffer 416 and used to reconstruct a true image of the page. Moreover, OMR image data and digital image data scanned from a next page, n+1, can be loaded into OMR Image Stream Buffer 417 and Digital Image Stream Buffer 418, respectively and used during reassembly of the scanned data.

Figure 5:
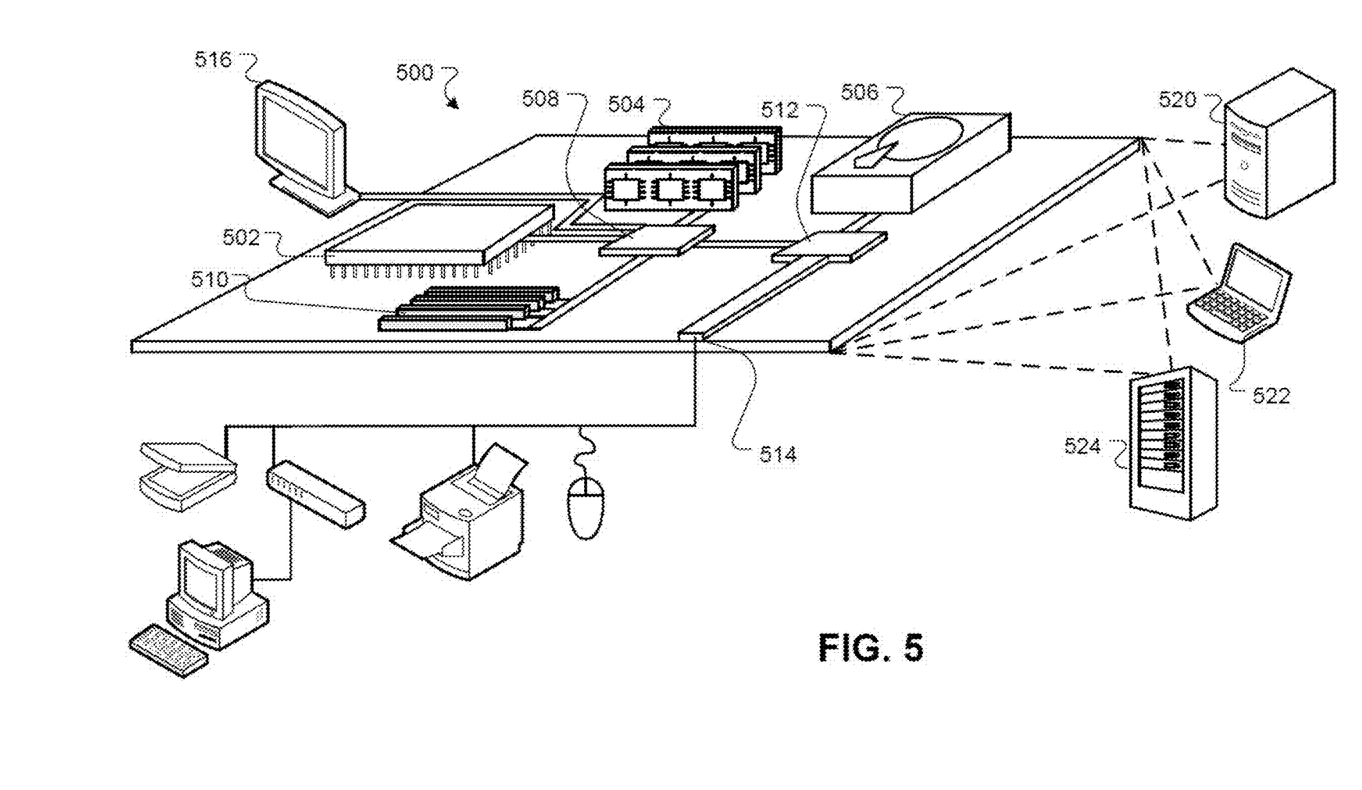
FIG. 5 is a block diagram of a computer device that may be used to implement the systems and methods described in this document.

FIG. 5 is a block diagram of computing device 500 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Additionally computing device 500 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Storage device 560 can also be used to implement a FIFO memory to buffer scanned data. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown). Each of such devices may contain one or more of computing device 500 and an entire system may be made up of multiple computing devices 500 communicating with each other.

Computing device 500 implemented as a mobile device can include a processor, memory, an input/output device such as a display, a communication interface, and a transceiver, among other components. The device may also be provided with a storage device, such as a microdrive or other device, to provide additional storage. Each of the components are interconnected using various buses, and several of the components may be mounted on a common motherboard or in other manners as appropriate.

The processor can execute instructions within the computing device, including instructions stored in the memory. The processor may be implemented as a chipset of chips that include separate and multiple analog and digital processors. The chips can be implemented as an application specific integrated circuit (ASIC) or FPGA microchip. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device, such as control of user interfaces, applications run by device, and wireless communication by device.

Processor may communicate with a user through control interface and display interface coupled to a display. The display may be, for example, a TFT (Thin-Film-Transistor Liquid Crystal Display) display or an OLED (Organic Light Emitting Diode) display, or other appropriate display technology. The display interface 556 may comprise appropriate circuitry for driving the display to present graphical and other information to a user. The control interface may receive commands from a user and convert them for submission to the processor. In addition, an external interface may be provided in communication with processor, so as to enable near area communication of device with other devices. External interface may provide, for example, for wired communication in some implementations, or for wireless communication in other implementations, and multiple interfaces may also be used.

The memory stores information within the computing device. The memory can be implemented as one or more of a computer-readable medium or media, a volatile memory unit or units, or a non-volatile memory unit or units. Expansion memory may also be provided and connected to device through expansion interface, which may include, for example, a SIMM (Single In Line Memory Module) card interface. Such expansion memory may provide extra storage space for device, or may also store applications or other information for device. Specifically, expansion memory may include instructions to carry out or supplement the processes described above, and may include secure information also. Thus, for example, expansion memory may be provide as a security module for device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

Figure 6:
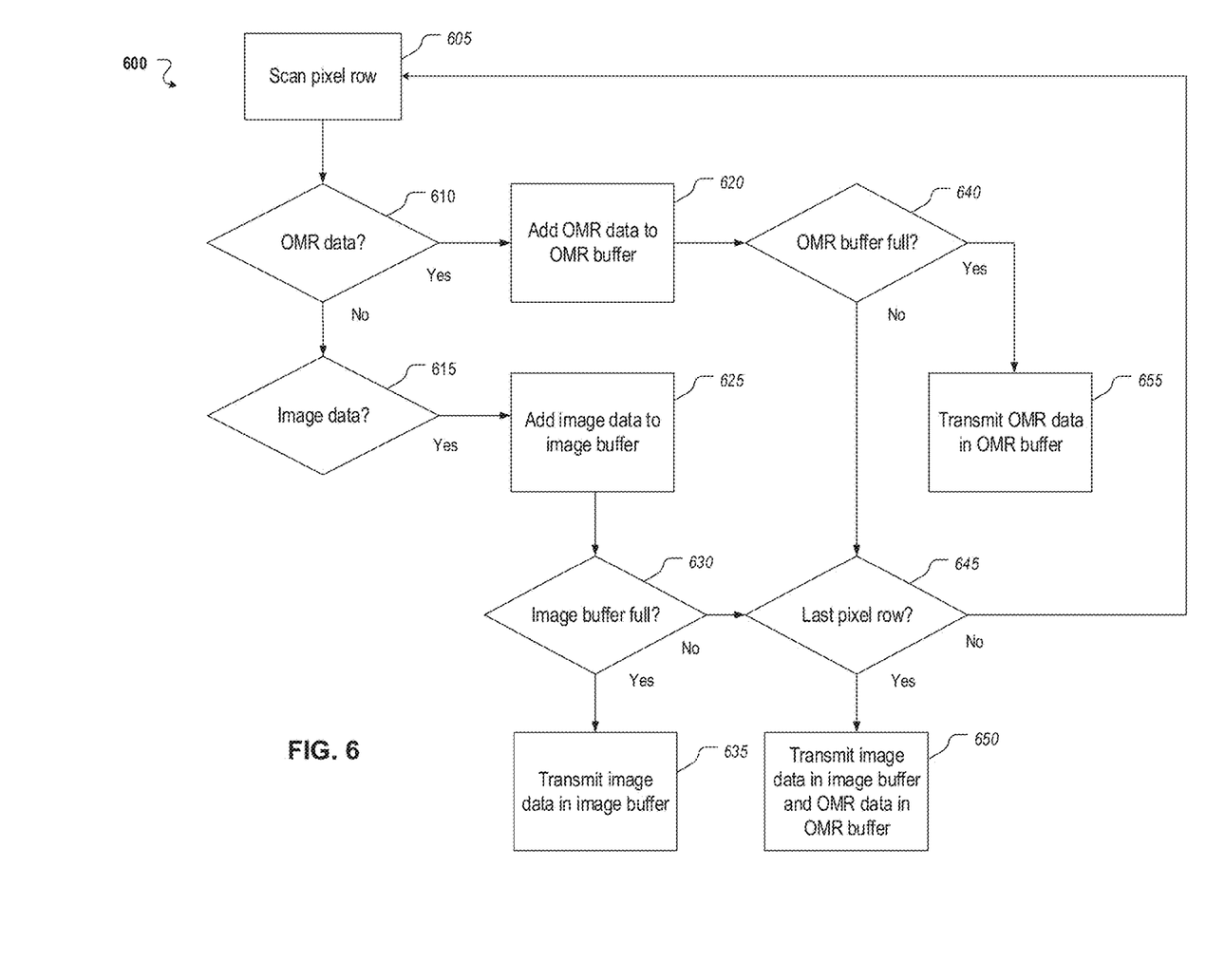
FIG. 6 is a flowchart for an example of a method used to implement data buffering and interleaved transmission of scanned data.

FIG. 6 is a flowchart for an example of a method used to implement scanned data buffering and interleaved transmission. At 605, a row of pixels are scanned from a substrate, where the scanner has received the substrate to be scanned using a form input tray, for example. In some embodiments, the substrate has one or more colors visible to a human eye (e.g., red, blue, orange, green, black, or grey) and bears marks made by the test-taker. Scanning a pixel row of a substrate, or page, can involve the scanner performing a single-pass scan of the substrate, e.g., by moving the substrate and a light sensor relative to each other such that the substrate moves past the light source a single time. In contrast, multiple passes can also be employed by the scanner to obtain scan data from a substrate. To accomplish this relative movement, either the substrate can be passed over a stationary sensor, or a sensor may be passed over the substrate while it is being held stationary, e.g., between a glass platen and another surface that together hold the substrate in place. This is accomplished by illuminating each portion of the substrate passing over the sensor with the at least one color of light, in sequence, and using a light sensor to capture the reflected light. A fourth color, infrared, may be included in this sequence if the scanner has been set to detect only graphite-based marks on the substrate, for OMR capture. Otherwise, one of the three colors (e.g., red) is used both to generate OMR data and that particular color channel of the image.

Thereafter, circuitry for an OMR device of the embodiments can perform a determination as to whether the data from the scanned pixel row is OMR data at 610 or image data at 615, in order to transfer the scanned data to an appropriate stream buffer. In the instance where OMR data is obtained from IR light, shown as "Yes" at 610, the associated data is transmitted to an OMR buffer at 620. Alternatively, the scanned pixels are determined to not convey OMR data, illustrated as "No" at 610. As an example, OMR device can be configured to perform scanning of full-color images (e.g., RGB) at 300 dots-per-image (DPI). Thus, based on the determination that image data has been obtained during scanning of the particular row, illustrated as "Yes" at 615, the scan data is transferred, or otherwise routed, to an image buffer at 625. According to the example, adding data to an image buffer can involve filling the image buffer in the arrangement of 2,592 bytes of red channel data, 2,592 bytes of green channel data, and 2,592 bytes of blue channel data.

Subsequently, checks 640, 630 are performed after adding the scanned data to a respective buffer, so as to determine whether the particular stream buffer has reached a maximum capacity, or otherwise has been deemed full. In some implementations, each stream buffer is implemented having a buffer size of 4 kilobytes. Accordingly, OMR buffer and/or image buffer can be consider full when either buffer has accumulated an amount of scanned data that equals its maximum size. At 640, it can be determined whether the OMR buffer is full. Similarly, at 630, it can be determined whether the image buffer is full. In the instance where the OMR buffer is full, shown as "Yes" at 640, the buffered OMR data can be transmitted 655 via a computer network to a remote computer system for storage and further processing, for example. Moreover, in the instance where the image buffer is full, shown as "Yes" at 630, the buffered image data is transmitted at 635.

Transmitting the buffered OMR data at 655 or image data at 650, respectively, can further include packetizing the buffered data. For example, an OMR buffer can be flushed of all OMR data temporarily stored during scanning, when the buffer has been deemed full. One or more data packets can be generated, including the 4 kilobytes of buffered OMR data, for subsequent transmission by the OMR device circuitry. Additionally, compression can be performed on scanned data received from a data buffer prior to packetization, and thereby realizing efficiency benefits associated with reducing the size of transmitted packets in a communications network. Complete packets can be generated comprising scanned data that is emptied from the buffering circuitry of an FPGA, for example, which allows packets of either OMR data or image data to be asynchronously transmitted as soon as the packets have been generated. Thus, packets of scan data (e.g., OMR data or image data) can be transmitted at each instance of a corresponding stream buffer becoming full and subsequently flushed, resulting in transmission which interleaves packets containing OMR data and packets containing image data.

In some embodiments, a FPGA chip for the OMR device is programmed to implement packet generation. An interface between a Media Access Controller (MAC) layer of a computer network and the FPGA fabric can be employed for accomplishing interleaved transmission of scanned data. Built-in logic, or logic downloaded to the chip, can be used to configure the FPGA performing for packetization functions. The circuitry can be configured for creating packets of scan data, applying a header which identifies the source, type, and order of the packet, and further presenting to the MAC layer "start" and "end" indications for each packet. Data that is output from differing memory elements of the buffering circuitry (e.g., OMR buffer and image buffer) can be multiplexed onto a channel of the MAC layer, allowing the interleaved transmission of the respective streams of scanned data to be communicated by the computer network.

At 645, a check is performed so as to determine whether all of the data has been scanned, or otherwise processed, from the substrate. Upon determining that additional data needs to be obtained from the substrate (i.e., "No" at step 645), for example remaining rows of pencil marks on a form, the process can return to 605, and scanning of the current page can continue to be performed. In some implementations, scanning is iteratively accomplished for each row of pixel data included on the substrate. Consequently, the embodiments realize data buffering and interleaved transmission techniques that simultaneously transmits data that has already been scanned (e.g., buffered data) while continuing to complete scanning of more information on the same form.

At 650, if the substrate has been completely scanned (i.e., "Yes" at step 645), any scanned data that is still buffered in an OMR buffer or image buffer is transmitted to a computer system for downstream processing. According to the embodiments, this transmission can occurs while scanning operation commences on the next form to be scanned. After that, the process can repeats until no more forms remain to be scanned.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of performing optical mark recognition (OMR) scanning, the method comprising:

receiving a first substrate to be scanned, the first substrate having one or more colors visible to a human eye and bearing user-made marks;

scanning the first substrate using a plurality of colors of light emitted from a light sensor to simultaneously generate both (a) first image data representing a visual appearance of the first substrate, and (b) first OMR data corresponding to respective locations of the user-made marks on the first substrate;

routing both the generated first image data corresponding to the first substrate and the generated first OMR data corresponding to the first substrate to a first page buffer to be temporarily stored;

transmitting from the first page buffer at least a portion of the first image data and/or at least a portion of the first OMR data to a computer network;

receiving a second substrate to be scanned, the second substrate having one or more colors visible to a human eye and bearing user-made marks;

during the transmitting from the first page buffer, simultaneously scanning the second substrate using a plurality of colors of light emitted from the light sensor to simultaneously generate both (a) second image data representing a visual appearance of the second substrate, and (b) second OMR data corresponding to respective locations of the user-made marks on the second substrate; and routing both the generated second image data corresponding to the second substrate and the generated second OMR data corresponding to the second substrate to a second page buffer to be temporarily stored.

2. The method of claim 1, wherein the second page buffer is circuitry of an integrated circuit (IC) chip.

3. The method of claim 2, wherein the IC chip is a field programmable array (FPGA).

4. The method of claim 1, wherein the first page buffer is circuitry of an integrated circuit (IC) chip.

5. The method of claim 4, wherein the IC chip is a field programmable array (FPGA).

6. The method of claim 1, wherein the first substrate is scanned using multiple colors of light, one of which is infrared light, upon a determination that the substrate is to be scanned in a manner corresponding to graphite-based user-made marks.

7. The method of claim 1, wherein transmitting from the first page buffer comprises generating one or more packets comprising the at least a portion of the first image data and/or at least a portion of the first OMR data.

8. The method of claim 7, wherein transmitting from the first page buffer comprises transmitting the one or more packets to a computer system that is external to a device that performs the scanning via a computer network.

9. A method of performing optical mark recognition (OMR) scanning, the method comprising:

receiving a substrate to be scanned, the first substrate having at a plurality of pixels rows of colors visible to a human eye and bearing user-made marks;

scanning a first pixel row of the substrate using at least three colors of light emitted from a light sensor to simultaneously generate both (a) image data representing a visual appearance of the substrate, and (b) OMR data corresponding to respective locations of the user-made marks on the first substrate;

routing the generated image data to an image buffer;

routing the generated OMR data to an OMR buffer;

determining whether the image buffer or the OMR buffer has reached a maximum capacity;

based on the determining, transmitting at least a portion of the image data from the image buffer or at least a portion of the OMR data from the OMR buffer to a computer network; and during the transmitting, simultaneously scanning one or more additional pixel rows of the substrate using a plurality of colors of light emitted from the light sensor to simultaneously generate both (a) additional image data representing a visual appearance of the substrate, and (b) additional OMR data corresponding to respective locations of the user-made marks on the second substrate.

10. A system employed for performing optical mark recognition (OMR) scanning, the system comprising:

a computer network; and an OMR scanner coupled with the computer network, wherein the OMR scanner is programmed to: (i) receive a first substrate to be scanned, the first substrate having one or more colors visible to a human eye and bearing user-made marks; (ii) scan the first substrate using a plurality of colors of light emitted from a light sensor to simultaneously generate both (a) first image data representing a visual appearance of the first substrate, and (b) first OMR data corresponding to respective locations of the user-made marks on the first substrate; (iii) route both the generated first image data corresponding to the first substrate and the generated first OMR data corresponding to the first substrate to a first page buffer to be temporarily stored; (iv) transmit from the first page buffer, to the computer network, at least a portion of the first image data and/or at least a portion of the first OMR data; and (v) receive a second substrate to be scanned, the second substrate having one or more colors visible to a human eye and bearing user-made marks; (vi) during the transmitting from the first page buffer, simultaneously scan the second substrate using a plurality of colors of light emitted from the light sensor to simultaneously generate both (a) second image data representing a visual appearance of the second substrate, and (b) second OMR data corresponding to respective locations of the user-made marks on the second substrate; and (vii) route both the generated second image data corresponding to the second substrate and the generated second OMR data corresponding to the second substrate to a second page buffer to be temporarily stored.

11. The system of claim 10, wherein the second page buffer is circuitry of an integrated circuit (IC) chip.

12. The system of claim 11, wherein the IC chip is a field programmable array (FPGA).

13. The system of claim 10, wherein the first page buffer is circuitry of an integrated circuit (IC) chip.

14. The system of claim 13, wherein the IC chip is a field programmable array (FPGA).

15. The system of claim 10, wherein the first substrate is scanned using multiple colors of light, one of which is infrared light, upon a determination that the substrate is to be scanned in a manner corresponding to graphite-based user-made marks.

16. The system of claim 10, wherein transmitting from the first page buffer comprises generating one or more packets comprising the at least a portion of the first image data and/or at least a portion of the first OMR data.

17. The system of claim 16, wherein transmitting from the first page buffer comprises transmitting the one or more packets to a computer system coupled with the computer network.

18. A system employed for performing optical mark recognition (OMR) scanning, the system comprising:

a computer network; and an OMR scanner coupled with the computer network, wherein the OMR scanner is programmed to: (i) receive a substrate to be scanned, the first substrate having at a plurality of pixels rows of colors visible to a human eye and bearing user-made marks; (ii) scan a first pixel row of the substrate using at least three colors of light emitted from a light sensor to simultaneously generate both (a) image data representing a visual appearance of the substrate, and (b) OMR data corresponding to respective locations of the user-made marks on the first substrate; (iii) route the generated image data to an image buffer; (iv) route the generated OMR data to an OMR buffer; (v) determine whether the image buffer or the OMR buffer has reached a maximum capacity; (vi) based on the determining, transmit, to the computer network, at least a portion of the image data from the image buffer or at least a portion of the OMR data from the OMR buffer; (vii) during the transmitting, simultaneously scan one or more additional pixel rows of the substrate using a plurality of colors of light emitted from the light sensor to simultaneously generate both (a) additional image data representing a visual appearance of the substrate, and (b) additional OMR data corresponding to respective locations of the user-made marks on a second substrate; (vii) and route the generated the generated additional OMR data to a second page buffer to be temporarily stored.

* * * * *

UNITED STATES PATENT AND TRADEMARK OFFICE
CERTIFICATE OF CORRECTION

PATENT NO. : 9,800,753 B1
APPLICATION NO. : 15/167855
DATED : October 24, 2017
INVENTOR(S) : Joe Zajac and Jonathan Ort Page 1 of 1

It is certified that error appears in the above-identified patent and that said Letters Patent is hereby corrected as shown below:

In the Claims

Column 19, Line 6 in Claim 18, delete "(vii) and" and insert -- and (vii) -- therefor.

Column 19, Line 6 in Claim 18, delete "the generated the generated" and insert -- the generated -- therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*